US012271145B2

(12) United States Patent
Ichiyanagi et al.

(10) Patent No.: US 12,271,145 B2
(45) Date of Patent: Apr. 8, 2025

(54) IMAGE FORMING APPARATUS

(71) Applicant: BROTHER KOGYO KABUSHIKI KAISHA, Nagoya (JP)

(72) Inventors: Masao Ichiyanagi, Ama (JP); Keita Shimizu, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/642,964

(22) Filed: Apr. 23, 2024

(65) Prior Publication Data

US 2024/0272581 A1 Aug. 15, 2024

Related U.S. Application Data

(63) Continuation of application No. 18/332,064, filed on Jun. 9, 2023, now Pat. No. 11,994,825, which is a (Continued)

(30) Foreign Application Priority Data

Sep. 28, 2018 (JP) ................................ 2018-184046

(51) Int. Cl.
*G03G 21/16* (2006.01)
*G03G 15/00* (2006.01)

(52) U.S. Cl.
CPC ....... *G03G 21/1676* (2013.01); *G03G 15/751* (2013.01); *G03G 21/1633* (2013.01); *G03G 2221/163* (2013.01)

(58) Field of Classification Search
CPC ........... G03G 21/1671; G03G 21/1676; G03G 15/0872; G03G 21/185; G03G 2215/0665
See application file for complete search history.

(56) References Cited

U.S. PATENT DOCUMENTS

2004/0184835 A1 9/2004 Park
2005/0169670 A1 8/2005 Noh
(Continued)

FOREIGN PATENT DOCUMENTS

CN 101833266 A 9/2010
JP 2004-271815 A 9/2004
(Continued)

OTHER PUBLICATIONS

International Search Report issued in corresponding International Patent Application No. PCT/JP2019/022499, Aug. 13, 2019.
(Continued)

*Primary Examiner* — Sevan A Aydin
(74) *Attorney, Agent, or Firm* — Merchant & Gould P.C.

(57) ABSTRACT

An image forming apparatus includes a drum cartridge and developing cartridge. The drum cartridge may include a photosensitive drum rotatable about a first axis extending in an axial direction. The developing cartridge may include a developing roller rotatable about a second axis extending in the axial direction. The image forming apparatus may include a main casing including a slot extending in the axial direction. The image forming apparatus may include a first inner surface positioned inside of the slot, and a second inner surface positioned inside of the slot farther from the cover in the axial direction than the first inner surface from the cover in the axial direction. The first and second inner surfaces may be configured to press the developing roller toward the photosensitive drum.

15 Claims, 12 Drawing Sheets

Related U.S. Application Data continuation of application No. 17/820,308, filed on Aug. 17, 2022, now Pat. No. 11,714,379, which is a continuation of application No. 17/492,072, filed on Oct. 1, 2021, now Pat. No. 11,448,999, which is a continuation of application No. 16/800,487, filed on Feb. 25, 2020, now Pat. No. 11,150,600, which is a continuation of application No. PCT/JP2019/022499, filed on Jun. 6, 2019.

(56) References Cited

U.S. PATENT DOCUMENTS

| | | | |
|---|---|---|---|
| 2007/0147889 | A1 | 6/2007 | Kamimura |
| 2008/0247784 | A1 | 10/2008 | Kakuta et al. |
| 2010/0080622 | A1 | 4/2010 | Uchida |
| 2014/0029979 | A1 | 1/2014 | Yamamoto |
| 2015/0277362 | A1 | 10/2015 | Yokoi et al. |
| 2017/0017197 | A1 | 1/2017 | Hwang |
| 2017/0023878 | A1 | 1/2017 | Uchida et al. |
| 2017/0075291 | A1 | 3/2017 | Yamaguchi |
| 2017/0248905 | A1 | 8/2017 | Anan et al. |
| 2017/0248906 | A1 | 8/2017 | Tanbe et al. |
| 2017/0315498 | A1 | 11/2017 | Abe et al. |
| 2018/0120758 | A1 | 5/2018 | Zensai et al. |
| 2018/0120763 | A1 | 5/2018 | Takano et al. |

FOREIGN PATENT DOCUMENTS

| | | | |
|---|---|---|---|
| JP | 2006-154500 | A | 6/2006 |
| JP | 2006-276176 | A | 10/2006 |
| JP | 2013-182103 | A | 9/2013 |
| JP | 2013-257490 | A | 12/2013 |
| JP | 2014-26214 | A | 2/2014 |
| JP | 2017-58485 | A | 3/2017 |
| JP | 2017-173805 | A | 9/2017 |
| JP | 2017-201389 | A | 11/2017 |
| JP | 2018-49198 | A | 3/2018 |
| JP | 2018-77459 | A | 5/2018 |
| KR | 10-0814425 | A1 | 3/2008 |

OTHER PUBLICATIONS

Written Opinion issued in corresponding International Patent Application No. PCT/JP2019/022499, Aug. 13, 2019.

International Search Report in App PCT/JP2019/022499 (Year: 2020), in parent application.

Office Action (Notice of Reasons for Refusal) issued in corresponding Japanese Patent Application No. 2022-004956, Jan. 10, 2023.

Office Action (Notice of Reasons for Refusal) issued in corresponding Japanese Patent Application No. 2023-064742, Feb. 20, 2024.

Notice of Reasons for Refusal issued in corresponding Japanese Patent Application No. 2024-081855, Dec. 24, 2024.

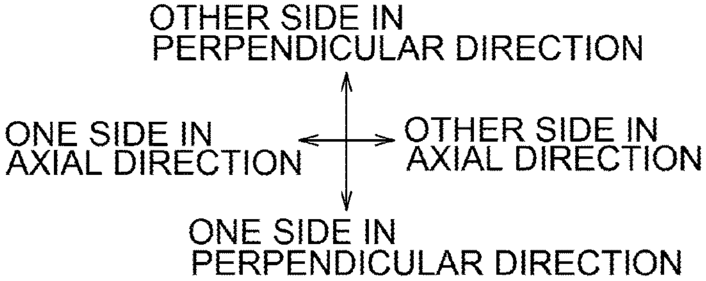
FIG. 6A
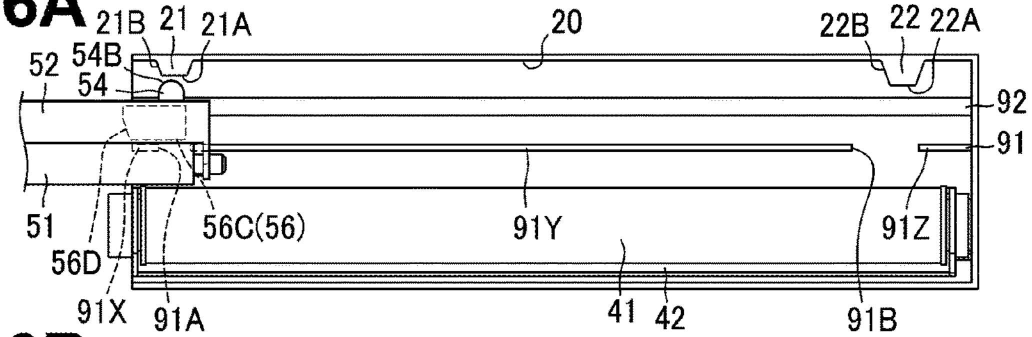
FIG. 6B
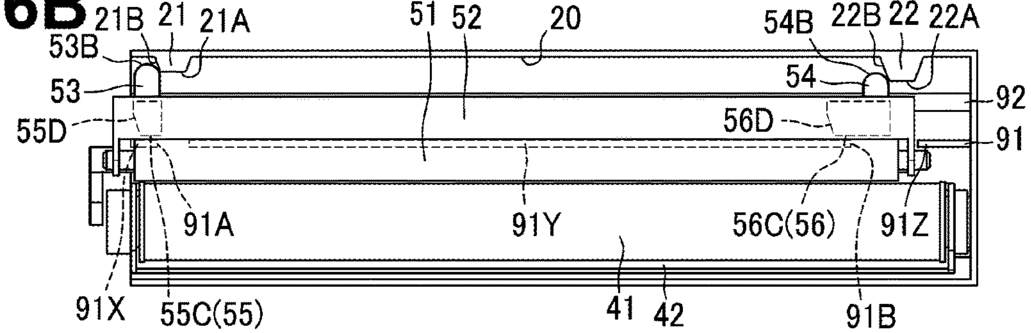
FIG. 6C
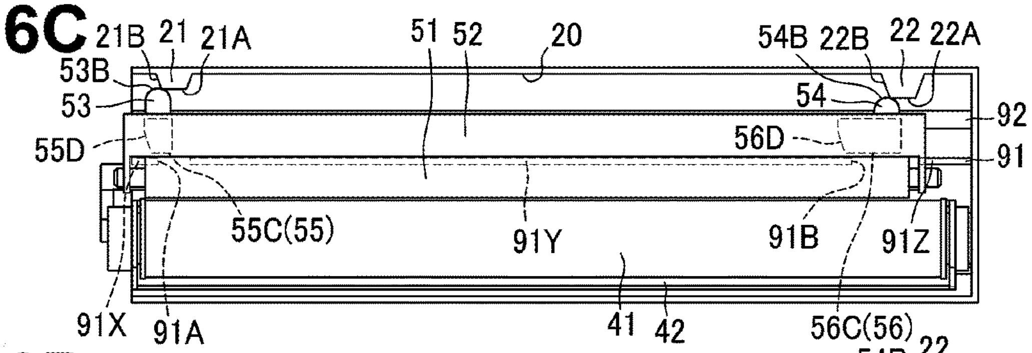
FIG. 6D
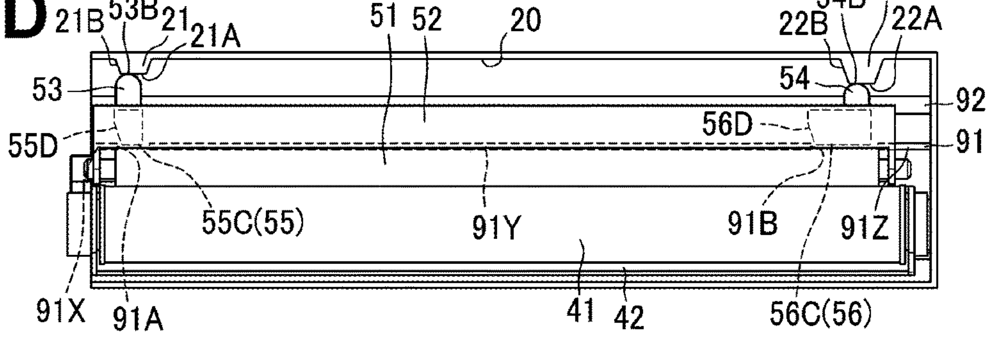

IMAGE FORMING APPARATUS

CROSS-REFERENCE TO RELATED APPLICATIONS

This is a continuation of U.S. patent application Ser. No. 18/332,064, filed Jun. 9, 2023, which is a continuation of U.S. patent application Ser. No. 17/820,308, filed Aug. 17, 2022, now U.S. Pat. No. 11,714,379, which is a continuation of U.S. patent application Ser. No. 17/492,072, filed Oct. 1, 2021, now U.S. Pat. No. 11,448,999, which is a continuation of U.S. patent application Ser. No. 16/800,487 filed on Feb. 25, 2020, now U.S. Pat. No. 11,150,600, which is a continuation of International Application No. PCT/JP2019/022499 filed on Jun. 6, 2019, which claims priority from Japanese Patent Application No. 2018-184046 filed on Sep. 28, 2018. The entire contents of the earlier applications are incorporated herein by reference.

TECHNICAL FIELD

Aspects of the disclosure relate to an image forming apparatus including a drum cartridge and a developing cartridge, each of which is removably insertable to a main body casing of the image forming apparatus.

BACKGROUND

Some known image forming apparatus is configured such that a drum cartridge and a developing cartridge are each insertable into and removable from a main body casing of the image forming apparatus in an axial direction of a photosensitive drum. Such a drum cartridge and a developing cartridge are individually insertable into and removable from the main body casing, respectively. In such an image forming apparatus, after the drum cartridge and the developing cartridge are attached to the main body casing, a developing roller of the developing cartridge is pressed toward the photosensitive drum of the drum cartridge.

SUMMARY

In the known image forming apparatus, for example, the developing cartridge may be inserted into the main body casing in a state where the drum cartridge is attached to the main body casing. Nevertheless, during insertion of the developing cartridge into the main body casing, the developing cartridge and the drum cartridge may interfere with each other.

Accordingly, aspects of the disclosure provide an image forming apparatus including a drum cartridge and a developing cartridge respectively insertable into and removable from a main body casing of the image forming apparatus in an axial direction, wherein the developing cartridge and the drum cartridge may be reduced or prevented from interfering with each other during insertion of the developing cartridge into the main body casing in the axial direction in a state where the drum cartridge is attached to the main body casing.

BRIEF DESCRIPTION OF THE DRAWINGS

FIGS. 6A to 6D illustrate a process of inserting or removing a developing cartridge into or from one of the slots according to the first illustrative embodiment of the disclosure.

DETAILED DESCRIPTION

Figure 1:
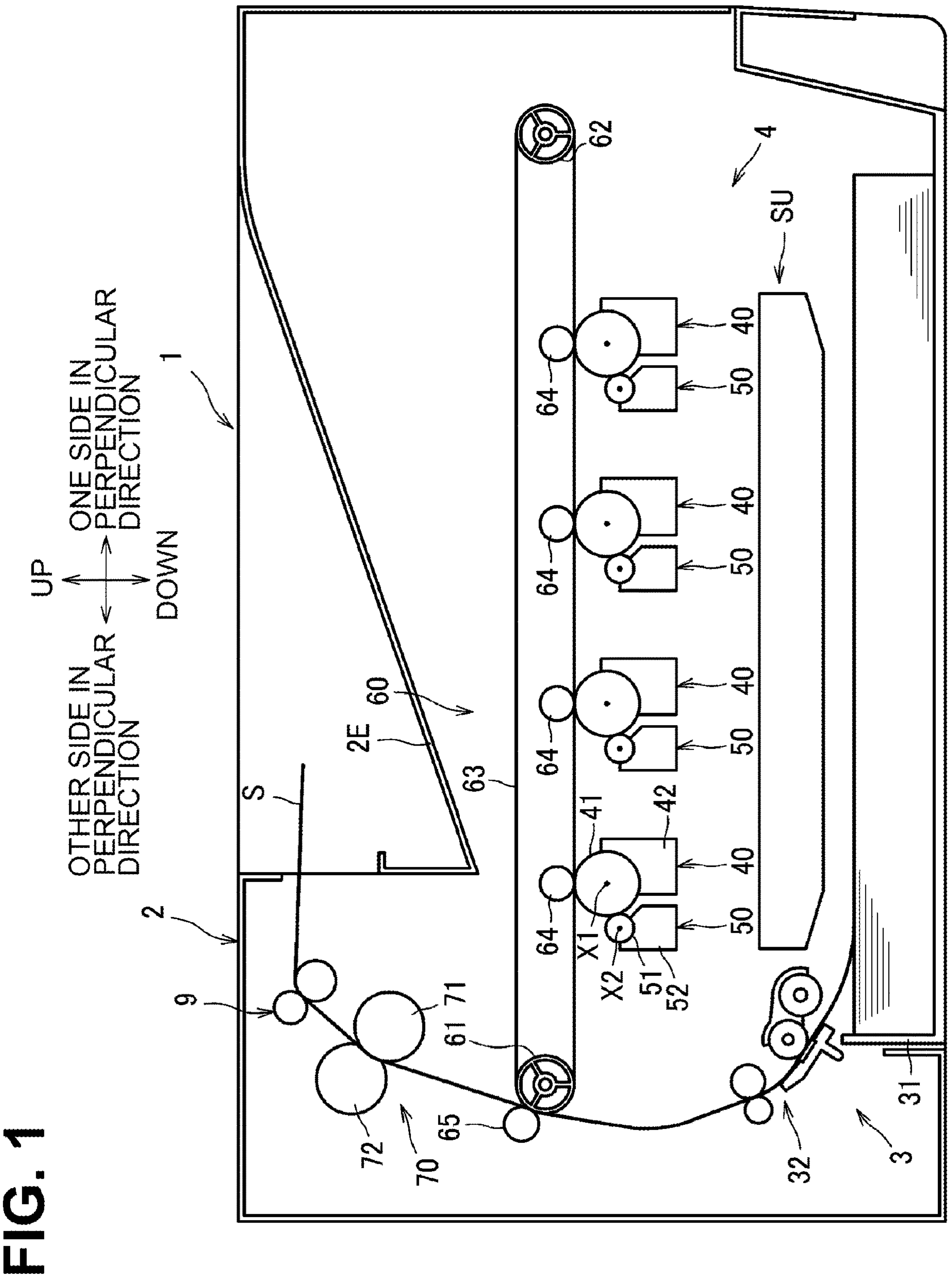
FIG. 1 illustrates a general configuration of an image forming apparatus according to a first illustrative embodiment of the disclosure.

Illustrative embodiments will be described with reference to the accompanying drawings. Hereinafter, a first illustrative embodiment of the disclosure will be described. In the description below, plural same components may have the same or similar configuration and function in the same or similar manner to each other. Therefore, one of the plural same components will be described in detail, and a description for the others will be omitted. As illustrated in FIG. 1, an image forming apparatus 1 may be a color printer. The image forming apparatus 1 includes a main body casing 2, a feed unit 3, an image forming unit 4, and discharge rollers 9. The feed unit 3 is configured to feed a sheet S to the image forming unit 4. The image forming unit 4 is configured to form an image onto a sheet S. The discharge rollers 9 are configured to convey a sheet S to discharge the sheet S to the outside of the main body casing 2.

The main body casing 2 includes a sheet receiving portion 2E at its top. The sheet receiving portion 2E is configured to receive a discharged sheet S. The sheet receiving portion 2E is positioned above an intermediate transfer belt 63.

The feed unit 3 is positioned in a lower portion of the main body casing 2. The feed unit 3 includes a feed tray 31 and a feed mechanism 32. The feed tray 31 is insertable into and removable from the main body casing 2. The feed mechanism 32 is configured to feed a sheet S from the feed tray 31 to the image forming unit 4.

The image forming unit 4 includes a plurality of drum cartridges 40, a plurality of developing cartridges 50, an exposure device SU, a transfer unit 60, and a fixing unit 70. The number of drum cartridges 40 and the number of the developing cartridges 50 each correspond to the number of toner colors. In the first illustrative embodiment, for example, the drum cartridges 40 may include four drum cartridges 40 and the developing cartridges 50 may include four developing cartridges 50. The drum cartridges 40 and the developing cartridges 50 are arranged side by side in the image forming unit 4.

Each drum cartridge 40 includes a photosensitive drum 41, a frame 42, and a charger. The photosensitive drum 41 is rotatable about a first axis X1 extending in an axial direction. The photosensitive drums 41 are arranged in a direction perpendicular to both of the axial direction and an up-down direction (hereinafter, simply referred to as the perpendicular direction). The frame 42 supports the photosensitive drum 41 rotatably. The drum cartridges 40 are individually insertable into and removable from the main body casing 2 in the axial direction.

In a state where the drum cartridges 40 and the developing cartridges 50 are attached to the main body casing 2, the drum cartridges 40 and the developing cartridges 50 are alternately arranged in the perpendicular direction. More specifically, for example, in the first illustrative embodiment, each drum cartridge 40 is positioned to one side of a corresponding developing cartridge 50 in the perpendicular direction (e.g., to the right of a corresponding developing cartridge 50 in FIG. 1). Each developing cartridge 50 is positioned to the other side of a corresponding drum cartridge 40 in the perpendicular direction (e.g., to the left of the drum cartridge 40 in FIG. 1).

The developing cartridges 50 store toner of respective different colors. Each developing cartridge 50 includes a developing roller 51 and a developing casing 52. The developing roller 51 is rotatable about a second axis X2 extending in the axial direction. The developing casing 52 stores toner of a corresponding color. The developing rollers 51 are arranged in the perpendicular direction. The developing cartridges 50 are individually insertable into and removable from the main body casing 2 in the axial direction.

The exposure device SU is positioned below the drum cartridges 40. The exposure device SU is configured to irradiate a circumferential surface of each photosensitive drum 41 with a laser beam.

The transfer unit 60 is positioned between the photosensitive drums 41 and the sheet receiving portion 2E in the up-down direction. The transfer unit 60 includes a drive roller 61, a driven roller 62, the intermediate transfer belt 63, a plurality of, for example, four, first transfer rollers 64, and a second transfer roller 65.

The intermediate transfer belt 63 may be an endless belt. In a state where the drum cartridges 40 and the developing cartridges 50 are attached to the main body casing 2, the intermediate transfer belt 63 is positioned above the drum cartridges 40 and the developing cartridges 50. In such a state, the intermediate transfer belt 63 contacts the circumferential surface of each photosensitive drum 41. The intermediate transfer belt 63 is looped over the drive roller 61 and the driven roller 62.

The first transfer rollers 64 are positioned inside the loop of the intermediate transfer belt 63. The first transfer rollers 64 and the respective corresponding photosensitive drums 41 sandwich the intermediate transfer belt 63 therebetween.

The second transfer roller 65 is positioned outside the loop of the intermediate transfer belt 63. The second transfer roller 65 and the drive roller 61 sandwich the intermediate transfer belt 63 therebetween.

The fixing unit 70 is positioned above the intermediate transfer belt 63. The fixing unit 70 includes a heat roller 71 and a pressure roller 72. The pressure roller 72 is configured to be pressed toward the heat roller 71.

In the image forming unit 4, first, the charger charges the circumferential surface of each photosensitive drum 41. Thereafter, the exposure device SU exposes the circumferential surface of each photosensitive drum 41. Thus, an electrostatic latent image is formed on the circumferential surface of each photosensitive drum 41.

After that, each developing roller 51 supplies toner onto the electrostatic latent image formed on a corresponding photosensitive drum 41, thereby forming a toner image on the circumferential surface of each photosensitive drum 41. Each first transfer roller 64 then transfers the toner image onto an outer circumferential surface of the intermediate transfer belt 63 from the circumferential surface of the corresponding photosensitive drum 41.

When a sheet S passes between the intermediate transfer belt 63 and the second transfer roller 65, the second transfer roller 65 transfers the overlapping toner images onto the sheet S from the outer circumferential surface of the intermediate transfer belt 63. Thereafter, the fixing unit 70 fixes the transferred toner images onto the sheet S. The discharge rollers 9 then convey the sheet S to discharge the sheet S to the sheet receiving portion 2E.

Figure 2:
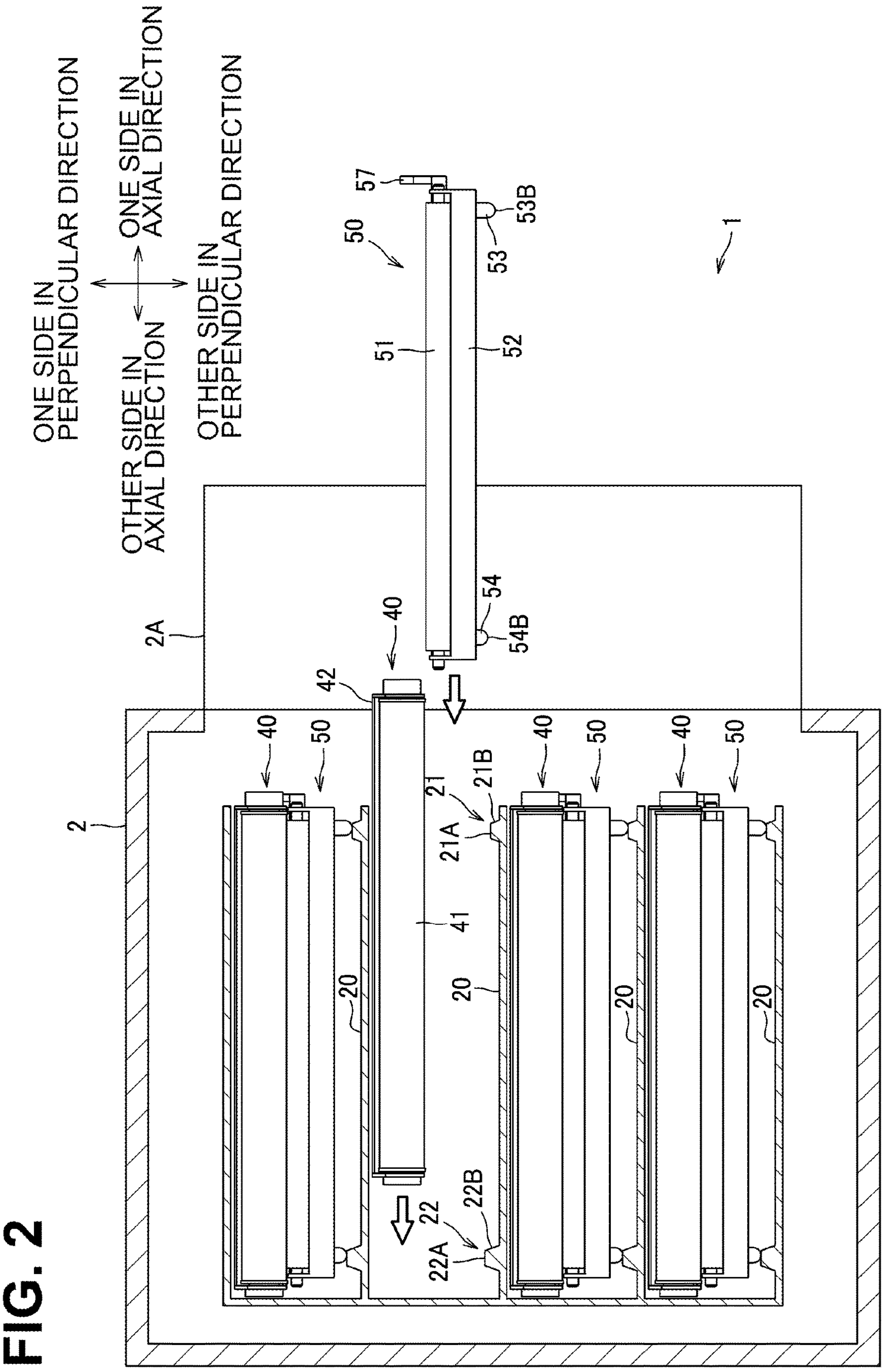
FIG. 2 illustrates a situation in which a drum cartridge and a developing cartridge are inserted into a corresponding one of slots according to the first illustrative embodiment of the disclosure.

As illustrated in FIG. 2, the main body casing 2 includes a cover 2A and a plurality of slots 20.

The cover 2A is positioned at a one-side end of the main body casing 2 in the axial direction. The cover 2A is openable and closable. The cover 2A has an open state in which the cover 2A covers the slots 20 and a closed state in which the cover 2A uncovers the slots 20.

The slots 20 are provided corresponding to each drum cartridge 40 and each developing cartridge 50. Each slot 20 extends in the axial direction. Each slot 20 has an open end that may be a one-side end in the axial direction. Each slot 20 is configured to allow a corresponding drum cartridge 40 to be inserted thereinto and removed therefrom in the axial direction. Each slot 20 is further configured to allow a corresponding developing cartridge 50 to be inserted thereinto and removed therefrom in the axial direction. That is, each slot 20 is configured to accommodate a single drum cartridge 40 and a single developing cartridge 50.

Figure 3:
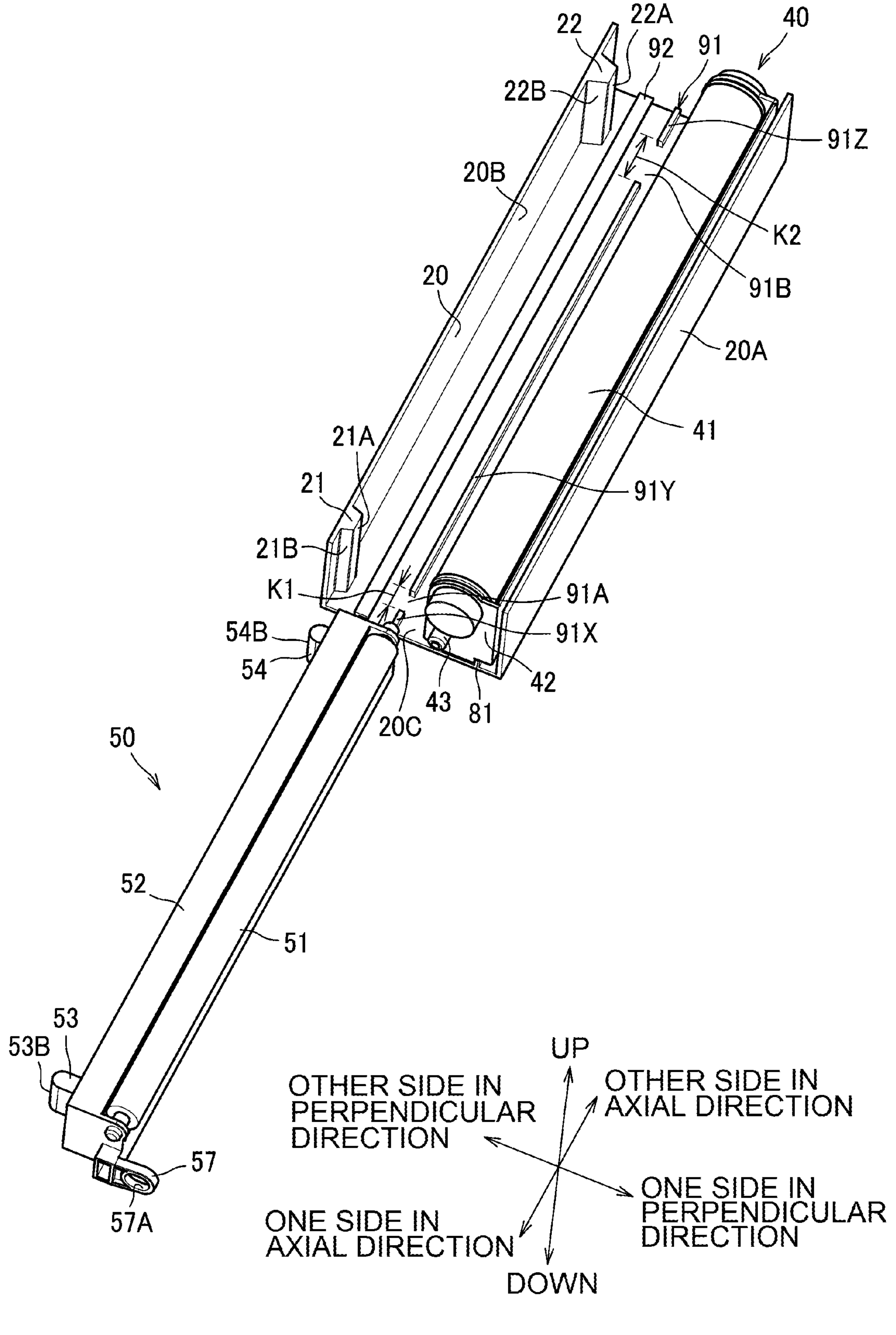
FIG. 3 is an upper perspective view of one of the slots, a drum cartridge and a developing cartridge according to the first illustrative embodiment of the disclosure.

FIG. 3 illustrates one of the slots 20. All of the slots 20 may have the same configuration, and therefore, the description of one of the slots 20 may apply to a remainder of the slots 20. As illustrated in FIG. 3, a slot 20 has a first wall 20A, a second wall 20B, and a third wall 20C. The first wall 20A extends in the axial direction and in the up-down direction. The second wall 20B faces the first wall 20A and is spaced from the first wall 20A by a specified distance in the perpendicular direction. The second wall 20B extends in the axial direction and in the up-down direction. The third wall 20C connects between one end of the first wall 20A and one end of the second wall 20B.

The second wall 20B includes a first protrusion 21 and a second protrusion 22. The first protrusion 21 and the second protrusion 22 are positioned inside the slot 20. The first protrusion 21 protrudes from the second wall 20B. The second protrusion 22 protrudes from the second wall 20B. The first protrusion 21 is positioned at a one-side end portion of the second wall 20B in the axial direction. The second protrusion 22 is positioned at an other-side end portion of the second wall 20B in the axial direction. That is, the second protrusion 22 is farther from the cover 2A than the first protrusion 21 is from the cover 2A in the axial direction (refer to FIG. 2).

Figure 4:
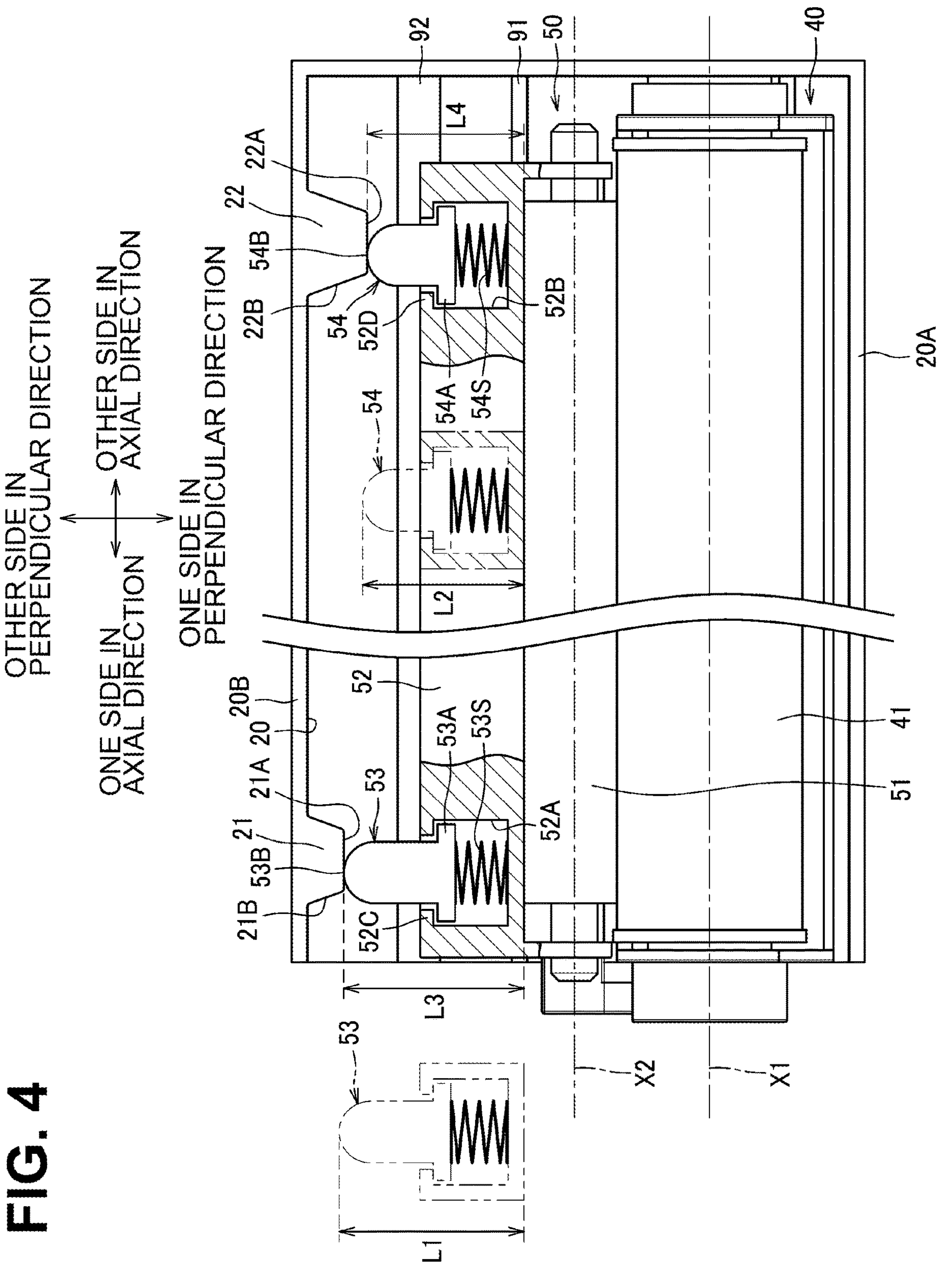
FIG. 4 is an explanatory diagram illustrating a mechanism for pressing a developing roller toward a photosensitive drum according to the first illustrative embodiment of the disclosure.

As illustrated in FIG. 4, the first protrusion 21 has a first inner surface 21A and a first inclined surface 21B. The first inner surface 21A and the first inclined surface 21B are positioned inside the slot 20. The first inner surface 21A protrudes relative to an inner surface of the slot 20. The first inner surface 21A is positioned at a protruding end of the first protrusion 21. The first inclined surface 21B is positioned to the one side of the first inner surface 21A in the axial direction. In a state where a drum cartridge 40 and a developing cartridge 50 are attached to the main body casing 2, the first inclined surface 21B extends in a direction away from the developing roller 51 as the first inclined surface 21B extends from the first inner surface 21A toward the cover 2A.

The second protrusion 22 has a second inner surface 22A and a second inclined surface 22B. The second inner surface 22A and the second inclined surface 22B are positioned inside the slot 20. The second inner surface 22A protrudes relative to the inner surface of the slot 20. The second inner surface 22A is positioned at a protruding end of the second protrusion 22. That is, the second inner surface 22A is farther from the cover 2A than the first inner surface 21A is from the cover 2A in the axial direction (refer to FIG. 2). The second inclined surface 22B is positioned to the one side of the second inner surface 22A in the axial direction. In a state where the drum cartridge 40 and the developing cartridge 50 are attached to the main body casing 2, the second inclined surface 22B extends in a direction away from the developing roller 51 as the second inclined surface 22B extends from the second inner surface 22A toward the cover 2A.

In the first illustrative embodiment, the first inclined surface 21B and the second inclined surface 22B are inclined at the same angle.

As illustrated in FIG. 4, in a state where the developing cartridge 50 is attached to the main body casing 2, an interval L3 between the first inner surface 21A and the circumferential surface of the developing roller 51 is greater than an interval L4 between the second inner surface 22A and the circumferential surface of the developing roller 51. That is, in a state where the developing cartridge 50 is attached to the main body casing 2, the first inner surface 21A is farther from the developing roller 51 than the second inner surface 22A is from the developing roller 51.

Figure 5:
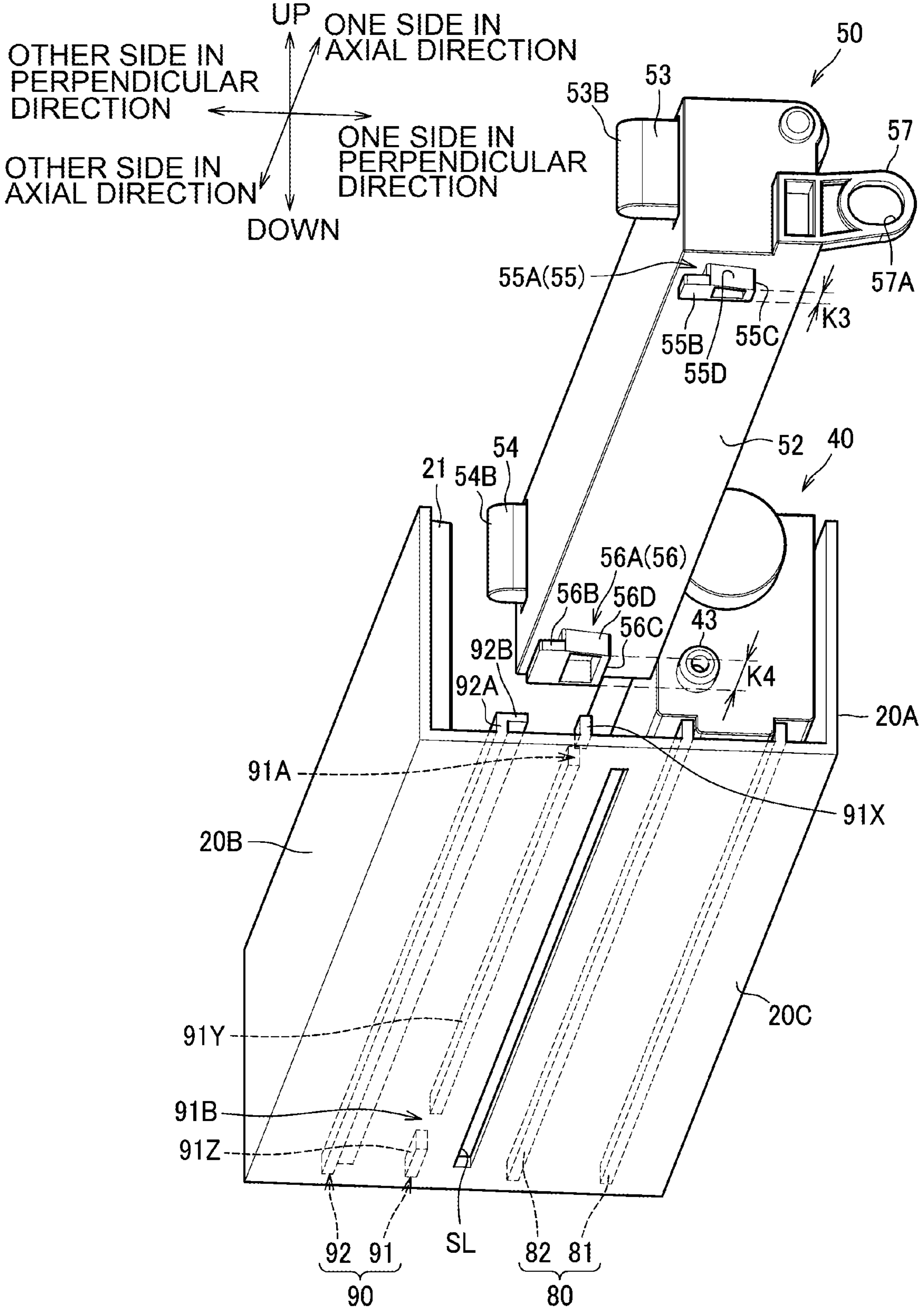
FIG. 5 is a bottom perspective view of one of the slots, a drum cartridge, and a developing cartridge according to the first illustrative embodiment of the disclosure.

As illustrated in FIG. 5, the third wall 20C includes a first guide 80, a second guide 90, and a slit SL.

The first guide 80 includes a first rail 81 and a second rail 82. The first rail 81 and the second rail 82 are positioned inside the slot 20. The first rail 81 and the second rail 82 protrude from the third wall 20C. The first rail 81 and the second rail 82 each extend from a one-side end to an other-side end of the slot 20 in the axial direction. The first rail 81 and the second rail 82 are configured to, during insertion or removal of the drum cartridge 40 into or from the slot 20, guide the drum cartridge 40 to move in the axial direction and restrict the drum cartridge 40 from moving in the perpendicular direction. The first rail 81 and the second rail 82 are further configured to, in a state where the drum cartridge 40 is attached to the slot 20, restrict the drum cartridge 40 from moving in the perpendicular direction.

The second guide 90 is an example of a guide configured to guide movement of a developing cartridge during insertion of the developing cartridge. The second guide 90 is configured to, during insertion or removal of the developing cartridge 50 into or from the slot 20, restrict the developing roller 51 from contacting a corresponding photosensitive drum 41. The second guide 90 is further configured to, in a state where the developing cartridge 50 is attached to the slot 20, allow the developing roller 51 to contact the photosensitive drum 41.

The second guide 90 includes a third rail 91 and a fourth rail 92. The third rail 91 and the fourth rail 92 are positioned inside the slot 20. The third rail 91 and the fourth rail 92 protrude from the third wall 20C. The third rail 91 and the fourth rail 92 each extend from the one-side end to the other-side end of the slot 20 in the axial direction. The first rail 81, the second rail 82, the third rail 91, and the fourth rail 92 are positioned in parallel to each other in this order from the one side of the slot 20 in the perpendicular direction.

The third rail 91 includes a first rail section 91X, a second rail section 91Y, and a third rail section 91Z. The third rail 91 has a first gap 91A between the first rail section 91X and the second rail section 91Y in the axial direction. The third rail 91 further has a second gap 91B between the second rail section 91Y and the third rail section 91Z in the axial direction. The first gap 91A is positioned at the one-side end portion of the slot 20 in the axial direction. The second gap 91B is positioned at the other-side end portion of the slot 20 in the axial direction. The first gap 91A has a dimension K1 in the axial direction. The second gap 91B has a dimension K2 in the axial direction. The dimension K1 is smaller than the dimension K2 (refer to FIG. 3).

The fourth rail 92 protrudes from the third wall 20C. The fourth rail 92 includes a first portion 92A and a second portion 92B. The first portion 92A extends upward from the third wall 20C. The second portion 92B extends from an upper end of the first portion 92A toward the one side in the perpendicular direction.

The third rail 91 and the fourth rail 92 are configured to, during insertion or removal of the developing cartridge 50 into or from the slot 20, guide the developing cartridge 50 to move in the axial direction and restrict the developing cartridge 50 from moving in the perpendicular direction. The fourth rail 92 is further configured to, during the insertion or removal of the developing cartridge 50 into or from the slot 20, engage with at least one of a first engagement portion 55 or a second engagement portion 56 of the developing cartridge 50 to restrict the developing cartridge 50 from moving in the up-down direction.

The slit SL extends in the axial direction. The slit SL is configured to allow a laser beam emitted by the exposure device SU to pass therethrough.

Each developing cartridge 50 (only one of the developing cartridges 50 is illustrated in FIG. 5) further includes a first pressing member 53, a second pressing member 54, the first engagement portion 55, the second engagement portion 56, and a bearing portion 57.

As illustrated in FIG. 4, the developing casing 52 has a first hollow 52A and a second hollow 52B. The first hollow 52A and the second hollow 52B each open to the other side in the perpendicular direction. The first hollow 52A is positioned at a one-side end portion of the developing casing 52 in the axial direction. The second hollow 52B is positioned at an other-side end portion of the developing casing 52 in the axial direction. The first hollow 52A includes a flange 52C at its open end. The flange 52C serves as a stopper for preventing the first pressing member 53 from disengaging from the first hollow 52A. The second hollow 52B includes a flange 52D at its open end. The flange 52D serves as a stopper for preventing the second pressing member 54 from disengaging from the second hollow 52B.

The first pressing member 53 is engaged with the first hollow 52A. The first pressing member 53 is supported by the first hollow 52A so as to be slidable in the perpendicular direction relative to the first hollow 52A. The first pressing member 53 includes a flange 53A at its base end. The flange 53A of the first pressing member 53 is contactable to the flange 52C of the first hollow 52A to prevent the first pressing member 53 from disengaging from the first hollow 52A. The first pressing member 53 has a first contactable surface 53B at its tip. The first contactable surface 53B protrudes to the outside of the developing casing 52. The first contactable surface 53B is rounded when viewed from above. A spring 53S is positioned between a base end face of the first pressing member 53 and the bottom of the first hollow 52A. The spring 53S urges the first pressing member 53 toward the other side in the perpendicular direction at all times.

The first pressing member 53 is configured such that, in a state where the developing cartridge 50 is attached to the slot 20, the tip of the first pressing member 53 contacts the first inner surface 21A of the slot 20 via the first contactable surface 53B. The first contactable surface 53B is configured to, in a case where the developing cartridge 50 is inserted into the slot 20 in a state where the drum cartridge 40 is attached to the slot 20, contact the first inner surface 21A.

The second pressing member 54 is engaged with the second hollow 52B. The second pressing member 54 is supported by the second hollow 52B so as to be slidable in the perpendicular direction relative to the second hollow 52B. The second pressing member 54 includes a flange 54A at its base end. The flange 54A of second pressing member 54 is contactable to the flange 52D of the second hollow 52B to prevent the second pressing member 54 from disengaging from the second hollow 52B. The second pressing member 54 has a second contactable surface 54B at its tip. The second contactable surface 54B protrudes to the outside of the developing casing 52. The second contactable surface 54B is rounded when viewed from above. A spring 54S is positioned between a base end face of the second pressing member 54 and the bottom of the second hollow 52B. The spring 54S urges the second pressing member 54 toward the other side in the perpendicular direction at all times.

The second pressing member 54 is configured such that, in a state where the developing cartridge 50 is attached to the slot 20, the tip of the second pressing member 54 contacts the second inner surface 22A of the slot 20 via the second contactable surface 54B. The second contactable surface 54B is configured to, in a case where the developing cartridge 50 is inserted into the slot 20 in a state where the drum cartridge 40 is attached to the slot 20, contact the second inner surface 22A.

In a state where the developing cartridge 50 is out of the slot 20, an interval L1 between the tip of the first pressing member 53 and the circumferential surface of the developing roller 51 is greater than an interval L2 between the tip of the second pressing member 54 and the circumferential surface of the developing roller 51. That is, in such a state, the tip of the first pressing member 53 having the first contactable surface 53B is farther from the developing roller 51 than the tip of the second pressing member 54 having the second contactable surface 54B is from the developing roller 51.

The interval L3 between the first inner surface 21A and the circumferential surface of the developing roller 51 is greater than the interval L4 between the second inner surface 22A and the circumferential surface of the developing roller 51.

In a state where the drum cartridge 40 and the developing cartridge 50 are attached to the slot 20, the interval L1 between the tip of the first pressing member 53 having the first contactable surface 53B and the circumferential surface of the developing roller 51 is greater than the interval L2 between the tip of the second pressing member 54 having the second contactable surface 54B and the circumferential surface of the developing roller 51. That is, in such a state, the tip of the first pressing member 53 having the first contactable surface 53B is farther from the developing roller 51 than the tip of the second pressing member 54 having the second contactable surface 54B is from the developing roller 51.

In a state where the drum cartridge 40 and the developing cartridge 50 are attached to the slot 20, the first inner surface 21A and the first contactable surface 53B contact with each other at a first contact position and the second inner surface 22A and the second contactable surface 54B contact with each other at a second contact position. An interval between the first contact position and the circumferential surface of the developing roller 51 is equal to the interval L3. An interval between the second contact position and the circumferential surface of the developing roller 51 is equal to the interval L4. That is, the first contact position is farther from the developing roller 51 than and the second contact position is from the developing roller 51.

The interval L2 between the tip of the second pressing member 54 and the circumferential surface of the developing roller 51 is shorter than the interval L3 between the first inner surface 21A and the circumferential surface of the developing roller 51 (the interval L2 is indicated by a double-dotted-and dashed line in FIG. 4). Such a configuration may thus enable the second contactable surface 54B to be reduced or prevented from contacting the first inner surface 21A during insertion of the developing cartridge 50 into the slot 20 in a state where its corresponding drum cartridge 40 is attached to the main body casing 2.

Each of the first pressing member 53 and the second pressing member 54 is an example of a pressing member. In the first illustrative embodiment, the pressing member includes both of the first pressing member 53 and the second pressing member 54. The first pressing member 53 and the second pressing member 54 are configured to press the developing roller 51 toward the photosensitive drum 41 in a state where the first contactable surface 53B and the second contactable surface 54B contact the first inner surface 21A and the second inner surface 22A, respectively.

As illustrated in FIG. 5, the first engagement portion 55 is positioned at a lower surface of the developing casing 52. The first engagement portion 55 includes a first body portion 55A and a first extended portion 55B. The first body portion 55A protrudes downward from the lower surface of the developing casing 52.

The first extended portion 55B extends from a lower end of the first body portion 55A toward the other side in the perpendicular direction.

The first body portion 55A has a first surface 55C and a second surface 55D. The first surface 55C extends in the axial direction. The first surface 55C may contact the third rail 91 during insertion or removal of the developing cartridge 50. The second surface 55D inclinatorily extends from the first surface 55C. More specifically, for example, the second surface 55D is inclined relative to the axial direction such that the second surface 55D inclinatorily extends toward the other side in the perpendicular direction as the second surface 55D extends toward the one side in the axial direction from the first surface 55C. The second surface 55D may contact the first rail section 91X of the third rail 91 during removal of the developing cartridge 50 from the slot 20.

The first body portion 55A is configured such that the movement of the first body portion 55A toward the one side in the perpendicular direction is restricted by the third rail 91. The first extended portion 55B is configured such that the movement of the first extended portion 55B toward the other side in the perpendicular direction is restricted by the first portion 92A of the fourth rail 92. The first extended portion 55B is further configured such that the upward movement of the first extended portion 55B is restricted by the second portion 92B of the fourth rail 92.

The first engagement portion 55 has a dimension K3 in the axial direction. The second engagement portion 56 has a dimension K4 in the axial direction. The dimension K3 is smaller than the dimension K4 in the axial direction. The dimension K3 of the first engagement portion 55 is smaller than the dimension K1 of the first gap 91A in the axial direction. The dimension K3 of the first engagement portion 55 is smaller than the dimension K2 of the second gap 91B in the axial direction.

The second engagement portion 56 is positioned at the lower surface of the developing casing 52. The second engagement portion 56 includes a second body portion 56A and a second extended portion 56B. The second body portion 56A protrudes downward from the lower surface of the developing casing 52. The second extended portion 56B extends from a lower end of the second body portion 56A toward the other side in the perpendicular direction.

The second body portion 56A has a third surface 56C and a fourth surface 56D. The third surface 56C extends in the axial direction. The third surface 56C may contact the third rail 91 during insertion or removal of the developing cartridge 50. The fourth surface 56D inclinatorily extends from the third surface 56C. More specifically, for example, the fourth surface 56D is inclined relative to the axial direction such that the fourth surface 56D inclinatorily extends toward the other side in the perpendicular direction as the fourth surface 56D extends toward the one side in the axial direction from the third surface 56C. The fourth surface 56D may contact the second rail section 91Y of the third rail 91 during removal of the developing cartridge 50 from the slot 20.

The second body portion 56A is configured such that the movement of the second body portion 56A toward the one side in the perpendicular direction is restricted by the third rail 91.

The second extended portion 56B is configured such that the movement of the second extended portion 56B toward the other side in the perpendicular direction is restricted by the first portion 92A of the fourth rail 92. The second extended portion 56B is further configured such that the upward movement of the second extended portion 56B is restricted by the second portion 92B of the fourth rail 92.

The dimension K4 of the second engagement portion 56 is greater than the dimension K1 of the first gap 91A in the axial direction. The dimension K4 of the second engagement portion 56 is smaller than the dimension K2 of the second gap 91B in the axial direction.

The bearing portion 57 is positioned at a one-side end face of the developing casing 52 in the axial direction and extends therefrom toward the one side in the perpendicular direction. The bearing portion 57 has an elongated hole 57A. The elongated hole 57A is configured to engage with a boss 43 of the drum cartridge 40. The boss 43 is positioned at a one-side end face of the drum cartridge 40 in the axial direction.

Hereinafter, a description will be provided on a process of inserting one of the drum cartridges 40 and one of the developing cartridges 50 into a corresponding slot 20, and the description may also apply to the others. As illustrated in FIG. 6A, prior to the developing cartridge 50 being inserted to the slot 20, the drum cartridge 40 is attached to the slot 20. For inserting the developing cartridge 50 into the slot 20, the second engagement portion 56 of the developing cartridge 50 is engaged with the third rail 91 and the fourth rail 92. At that time, the developing roller 51 is not in contact with the photosensitive drum 41. In addition, the second contactable surface 54B of the developing cartridge 50 is not in contact with the first inner surface 21A of the slot 20. The dimension K4 of the second engagement portion 56 in the axial direction is greater than the dimension K1 of the first gap 91A in the axial direction. Thus, the second engagement portion 56 passes the first gap 91A without being caught in the first gap 91A.

As the developing cartridge 50 is further inserted toward the back of the slot 20 from the position of FIG. 6A, as illustrated in FIG. 6B, the first pressing member 53 contacts the first inclined surface 21B of the first protrusion 21 and the second pressing member 54 contacts the second inclined surface 22B of the second protrusion 22.

As the developing cartridge 50 is further inserted toward the back of the slot 20 from the position of FIG. 6B, as illustrated in FIG. 6C, the first pressing member 53 is pressed by the first inclined surface 21B and slides over the first inclined surface 21B to be displaced toward the developing roller 51 and the second pressing member 54 is pressed by the second inclined surface 22B and slides over the second inclined surface 22B to be displaced toward the developing roller 51. At that time, the first engagement portion 55 and the second engagement portion 56 are in contact with the third rail 91, thereby not allowing the developing cartridge 50 to move toward the one side in the perpendicular direction. The developing roller 51 is thus not in contact with the photosensitive drum 41.

As the developing cartridge 50 is further inserted toward the back of the slot 20 from the position of FIG. 6C, as illustrated in FIG. 6D, the first pressing member 53 contacts the first inner surface 21A. Likewise, the second pressing member 54 contacts the second inner surface 22A. In this way, the first contactable surface 53B of the first pressing member 53 contacts the first inner surface 21A. The second contactable surface 54B of the second pressing member 54 contacts the second inner surface 22A. At that time, a portion of the first engagement portion 55 enters the first gap 91A and a portion of the second engagement portion 56 enters the second gap 91B.

Hereinafter, a description will be provided on a process of removing the drum cartridge 40 and the developing cartridge 50 from the slot 20. For removing the developing cartridge 50 from the slot 20, the developing cartridge 50 is drawn from the position of FIG. 6D toward the one side in the axial direction. In response to the developing cartridge 50 being drawn toward the one side in the axial direction, the second surface 55D of the first engagement portion 55 contacts the first rail section 91X of the third rail 91 and the fourth surface 56D of the second engagement portion 56 contacts the second rail section 91Y of the third rail 91.

As the developing cartridge 50 is further drawn toward the one side in the axial direction, the second surface 55D of the first engagement portion 55 is pressed by the first rail section 91X and thus, as illustrated in FIG. 6C, moves toward the other side in the perpendicular direction. The first surface 55C of the first engagement portion 55 therefore contacts the third rail 91. Likewise, the fourth surface 56D of the second engagement portion 56 is pressed by the second rail section 91Y and thus, as illustrated in FIG. 6C, the second engagement portion 56 moves toward the other side in the perpendicular direction. The third surface 56C of the second engagement portion 56 therefore contacts the third rail 91. As described above, in response to the developing cartridge 50 being drawn toward the one side in the axial direction, the developing cartridge 50 is pressed toward the other side in the perpendicular direction. Such an effect may enable the developing roller 51 to be separated from the photosensitive drum 41.

Thereafter, the developing cartridge 50 is further drawn toward the one side in the axial direction to be removed from the slot 20. During the removal of the developing cartridge 50 after the developing roller 51 is separated from the photosensitive drum 41, the developing cartridge 50 is guided by the third rail 91 and the movement of the developing cartridge 50 toward the one side in the perpendicular direction is restricted. The developing cartridge 50 may thus be drawn toward the one side in the axial direction without the developing roller 51 contacting the photosensitive drum 41.

According to the image forming apparatus 1 of the first illustrative embodiment, inserting a developing cartridge 50 into a corresponding slot 20 in a state where a corresponding drum cartridge 40 is attached to the slot 20 may enable a developing roller 51 of the developing cartridge 50 to be pressed toward a photosensitive drum 41 of the drum cartridge 40. In a case where the developing cartridge 50 is inserted into the main body casing 2 in the axial direction in a state where the corresponding drum cartridge 40 is attached to the main body casing 2 of the image forming apparatus 1, the configuration according to the first illustrative embodiment may reduce or prevent the developing cartridge 50 and the drum cartridge 40 from interfering with each other during insertion of the developing cartridge 50 into the main body casing 2.

In a case where the developing cartridge 50 is inserted into the slot 20 in a state where the corresponding drum cartridge 40 is attached to the main body casing 2, the second contactable surface 54B might not contact the first inner surface 21A. Such a configuration may thus enable smooth insertion of the developing cartridge 50 into the slot 20.

During the insertion of the developing cartridge 50 into the slot 20, the first inclined surface 21B guides the first contactable surface 53B to move the first contactable surface 53B onto the first inner surface 21A and the second inclined surface 22B guides the second contactable surface 54B to move the second contactable surface 54B onto the second inner surface 22A. Such a configuration may thus enable easy insertion of the developing cartridge 50 into the slot 20.

The second guide 90 is configured to, during the insertion or removal of the developing cartridge 50 into or from the slot 20, reduce or prevent the developing roller 51 from contacting the photosensitive drum 41. With this configuration, in a case where the developing cartridge 50 is inserted into the main body casing 2 in the axial direction in a state where the corresponding drum cartridge 40 is attached to the main body casing 2 of the image forming apparatus 1, the configuration according to the first illustrative embodiment may reduce or prevent the developing cartridge 50 and the drum cartridge 40 from interfering with each other during insertion of the developing cartridge 50 into the main body casing 2.

Hereinafter, a second illustrative embodiment will be described. A description will be provided mainly for the components or elements different from the first illustrative embodiment, and a description will be omitted for the common components or elements by assigning the same reference numerals thereto.

In the first illustrative embodiment, the protrusions include the first inner surface and the second inner surface, respectively, and the pressing members include the first contactable surface and the second contactable surface, respectively. Nevertheless, in other embodiments, for example, the pressing members may include such a first inner surface and a second inner surface, respectively, instead of the first contactable surface and the second contactable surface. The pressing members may include such a first contactable surface and a second contactable surface, respectively, instead of the first inner surface and the second inner surface.

Figure 7:
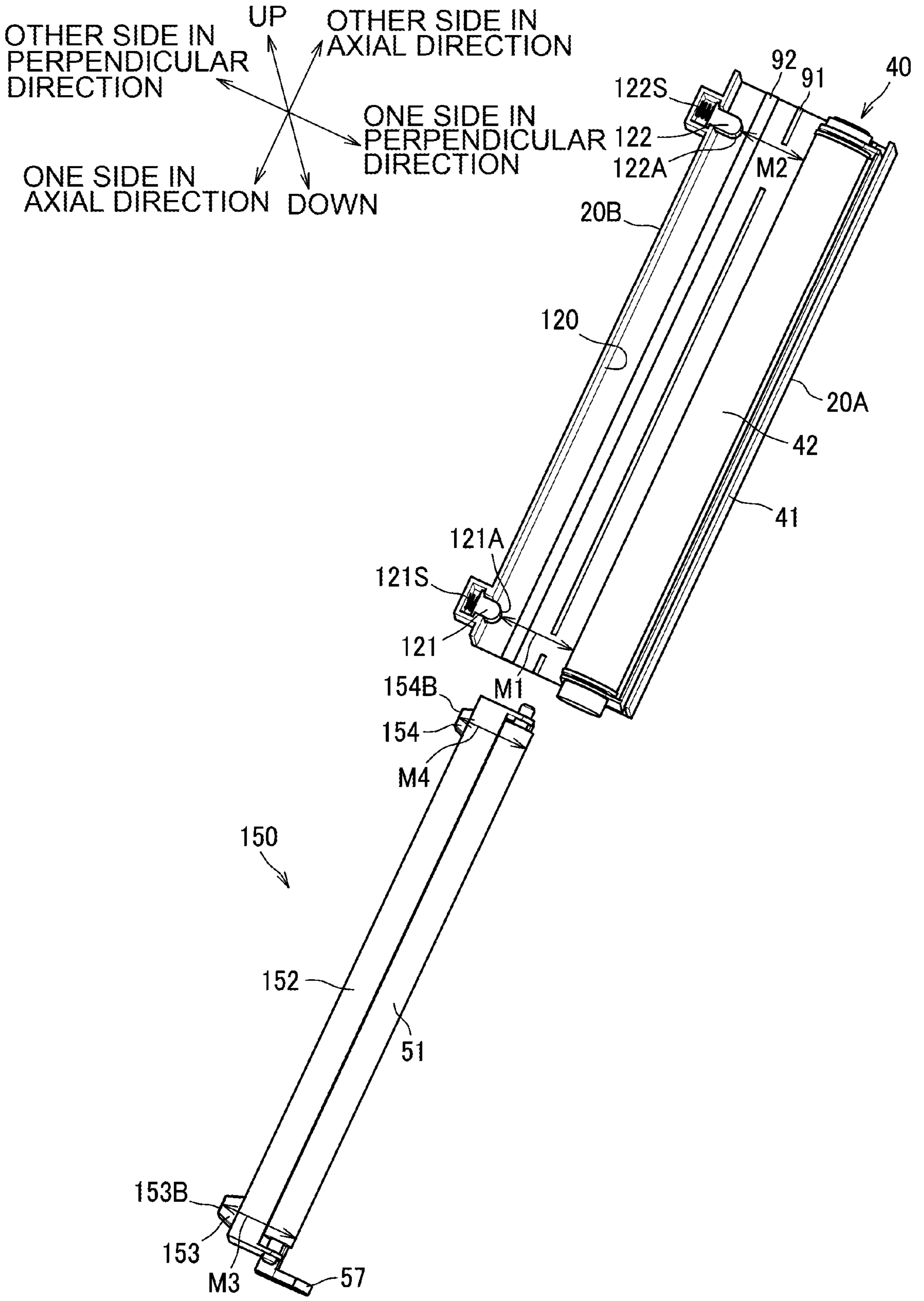
FIG. 7 is a perspective view of a slot, a drum cartridge, and a developing cartridge according to a second illustrative embodiment of the disclosure.

For example, as illustrated in FIG. 7, in the second illustrative embodiment, a first pressing member 121 includes a first inner surface 121A at its tip. A spring 121S is positioned inside a slot 120. The spring 121S is positioned at a base end face of the first pressing member 121. The spring 121S urges the first pressing member 121 toward the one side in the perpendicular direction at all times. A second pressing member 122 includes a second inner surface 122A at its tip. A spring 122S is positioned inside the slot 120. The spring 122S is positioned at a base end face of the second pressing member 122. The spring 122S urges the second pressing member 122 toward the one side in the perpendicular direction at all times.

A first protrusion 153 protrudes from a developing casing 152 and has a first contactable surface 153B at its protruding end. A second protrusion 154 protrudes from the developing casing 152 and has a second contactable surface 154B at its protruding end.

In a state where a developing cartridge 150 is attached to the slot 120 by insertion thereinto from the position of FIG. 7, the first inner surface 121A contacts the first contactable surface 153B. Likewise, the second inner surface 122A contacts the second contactable surface 154B.

In a state where the developing cartridge 150 is attached to the main body casing 2, an interval M1 between a tip of the first pressing member 121 having the first inner surface 121A and a circumferential surface of a photosensitive drum 41 is equal to an interval M3 between the first contactable surface 153B and the circumferential surface of the photosensitive drum 41. Likewise, in the state where the developing cartridge 150 is attached to the main body casing 2, an interval M2 between a tip of the second pressing member 122 having the second inner surface 122A and the circumferential surface of the photosensitive drum 41 is equal to an interval M4 between the second contactable surface 154B and the circumferential surface of the photosensitive drum 41.

In a state where the drum cartridge 40 and the developing cartridge 150 are attached to the main body casing 2, the interval M3 is greater than the interval M4. That is, in a state where the drum cartridge 40 and the developing cartridges 150 are attached to the main body casing 2, the first inner surface 121A is farther from the photosensitive drum 41 than the second inner surface 122A is from the photosensitive drum 41.

In a case where the developing cartridge 150 is inserted into the slot 120 in a state where the corresponding drum cartridge 40 is attached to the main body casing 2, the second contactable surface 154B might not contact the first inner surface 121A.

According to the configuration of the second illustrative embodiment, as is the case with the first illustrative embodiment, inserting a developing cartridge 150 into a corresponding slot 120 in a state where a corresponding drum cartridge 40 is attached to the slot 120 may enable a developing roller 51 of the developing cartridge 150 to be pressed toward a photosensitive drum 41 of the drum cartridge 40. In a case where the developing cartridge 150 is inserted into the main body casing 2 in the axial direction in a state where the corresponding drum cartridge 40 is attached to the main body casing 2 of the image forming apparatus 1, the configuration according to the second illustrative embodiment may reduce or prevent the developing cartridge 150 and the drum cartridge 40 from interfering with each other during insertion of the developing cartridge 50 into the main body casing 2.

Hereinafter, a third illustrative embodiment will be described. A description will be provided mainly for the components or elements different from the first illustrative embodiment, and a description will be omitted for the common components or elements by assigning the same reference numerals thereto.

In the first illustrative embodiment, the main body casing has the first inner surface and the second inner surface. Nevertheless, in other embodiments, for example, another member may have such first inner surface and second inner surface.

Figure 8:
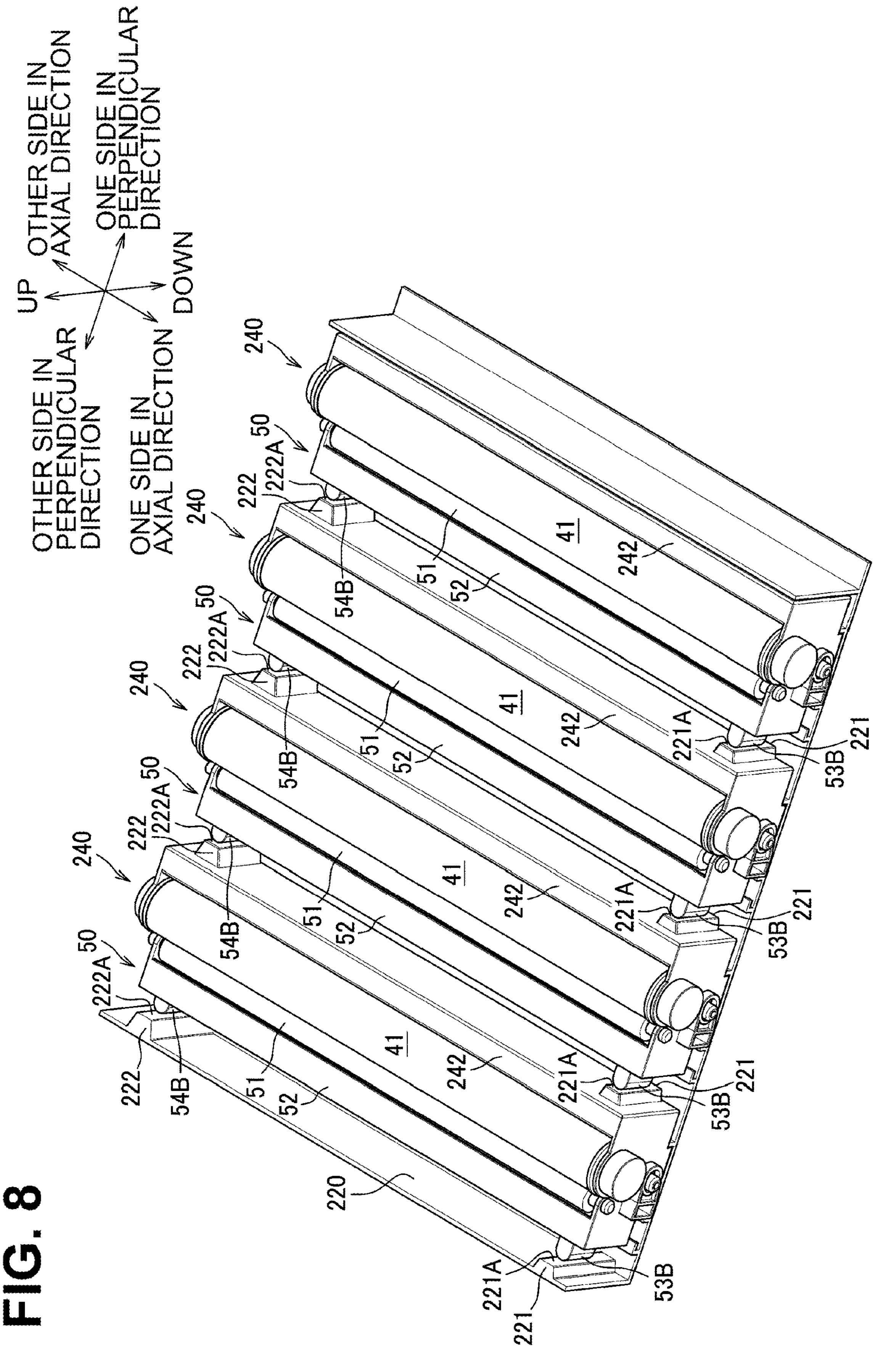
FIG. 8 is a perspective view of a slot, drum cartridges, and developing cartridges according to a third illustrative embodiment of the disclosure.

For example, as illustrated in FIG. 8, in the third illustrative embodiment, a slot 220 is configured to receive four drum cartridges 240 and four developing cartridges 50. Each developing cartridge 50 has a first contactable surface 53B. Each drum cartridge 240 positioned to the other side of a corresponding developing cartridge 50 in the perpendicular direction includes a first protrusion 221 having a first inner surface 221A at its frame 242. The other-side wall of the slot 220 in the perpendicular direction also includes a first protrusion 221 having a first inner surface 221A at its inner surface. Likewise, each developing cartridge 50 has a second contactable surface 54B. Each drum cartridge 240 positioned to the other side of a corresponding developing cartridge 50 in the perpendicular direction includes a second protrusion 222 having a second inner surface 222A at the frame 242. The other-side wall of the slot 220 in the perpendicular direction also includes a second protrusion 222 having a second inner surface 222A at its inner surface.

According to the configuration of the third illustrative embodiment, as is the case with the first illustrative embodiment, inserting a developing cartridge 50 into the slot 220 in a state where a corresponding drum cartridge 240 is attached to the slot 220 may enable a developing roller 51 of the developing cartridge 50 to be pressed toward a photosensitive drum 41 of the drum cartridge 240. In a case where the developing cartridge 50 is inserted into a main body casing 2 in the axial direction in a state where the corresponding drum cartridge 240 is attached to the main body casing 2 of an image forming apparatus 1, the configuration according to the third illustrative embodiment may reduce or prevent the developing cartridge 50 and the drum cartridge 240 from interfering with each other during insertion of the developing cartridge 50 into the main body casing 2. Further, in the third illustrative embodiment, the slot 220 might not include any inner partition wall between each drum cartridge 240 and between each developing cartridge 50. Such a configuration may thus enable size reduction of the image forming apparatus 1 in the perpendicular direction.

Hereinafter, a fourth illustrative embodiment will be described. A description will be provided mainly for the components or elements different from the second illustrative embodiment, and a description will be omitted for the common components or elements by assigning the same reference numerals thereto.

Figure 9:
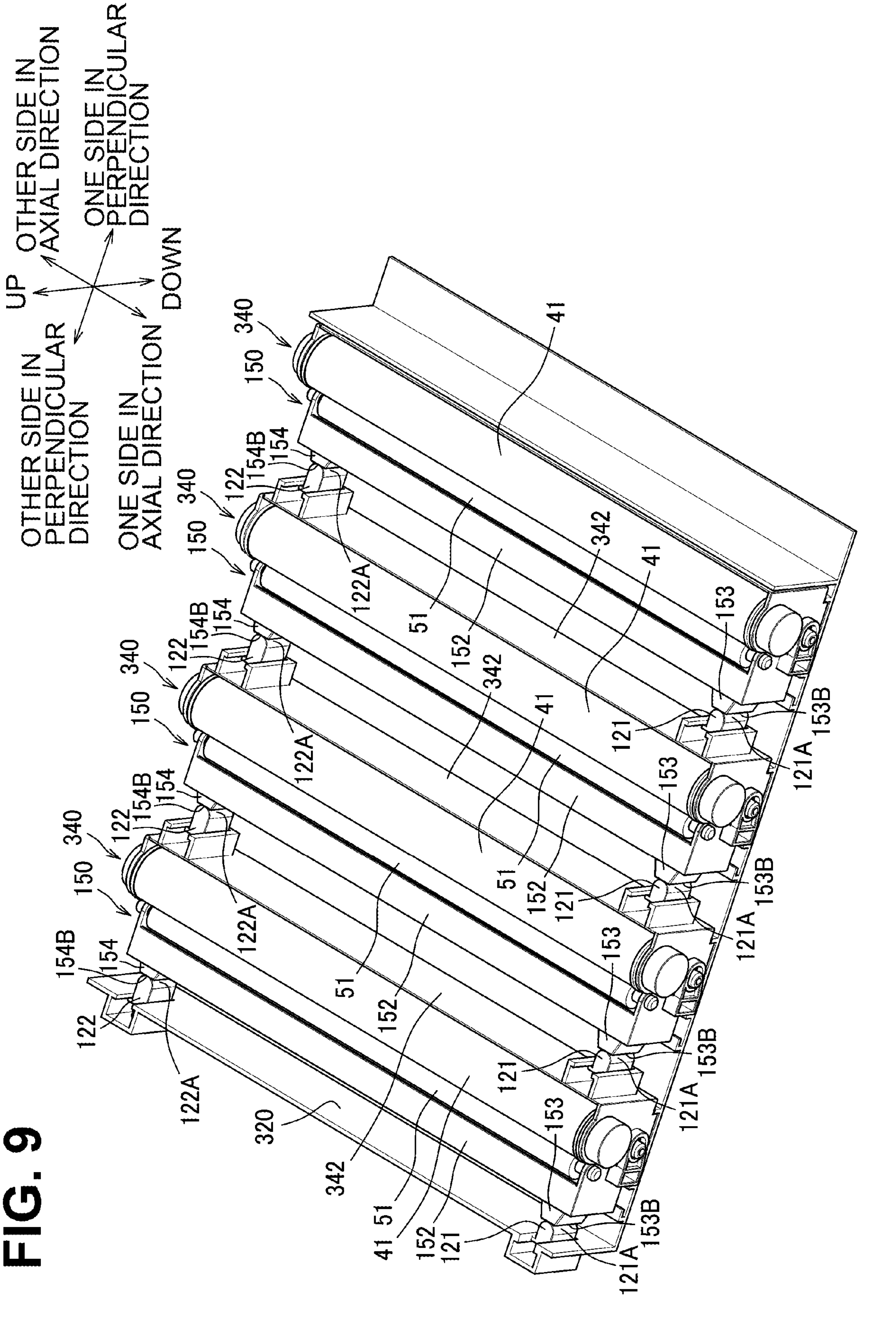
FIG. 9 is a perspective view of a slot, drum cartridges, and developing cartridges according to a fourth illustrative embodiment of the disclosure.

In the fourth illustrative embodiment, as illustrated in FIG. 9, each developing cartridge 150 has a first contactable surface 153B and a second contactable surface 154B. Each drum cartridge 340 positioned to the other side of a corresponding developing cartridge 150 in the perpendicular direction includes a first pressing member 121 having a first inner surface 121A and a second pressing member 122 having a second inner surface 122A at its frame 342. The other-side wall of the slot 220 in the perpendicular direction also includes a first pressing member 121 having a first inner surface 121A and a second pressing member 122 having a second inner surface 122A at its inner surface.

According to the configuration of the fourth illustrative embodiment, as is the case with the second illustrative embodiment, inserting a developing cartridge 150 into the slot 320 in a state where a corresponding drum cartridge 340 is attached to the slot 320 may enable a developing roller 51 of the developing cartridge 150 to be pressed toward a photosensitive drum 41 of the drum cartridge 340. In a case where the developing cartridge 150 is inserted into a main body casing 2 in the axial direction in a state where the corresponding drum cartridge 340 is attached to the main body casing 2 of an image forming apparatus 1, the configuration according to the fourth illustrative embodiment may reduce or prevent the developing cartridge 150 and the drum cartridge 340 from interfering with each other during insertion of the developing cartridge 50 into the main body casing 2. Further, in the fourth illustrative embodiment, the slot 320 might not include any inner partition wall between each drum cartridge 340 and between each developing cartridge 150. Such a configuration may thus enable size reduction of the image forming apparatus 1 in the perpendicular direction.

In the first to fourth illustrative embodiments, the first inclined surface of the first protrusion and the second inclined surface of the second protrusion are inclined at the same angle. Nevertheless, in other embodiments, for example, the first include surface and the second inclined surface may be inclined at respective different angles.

Figure 10:
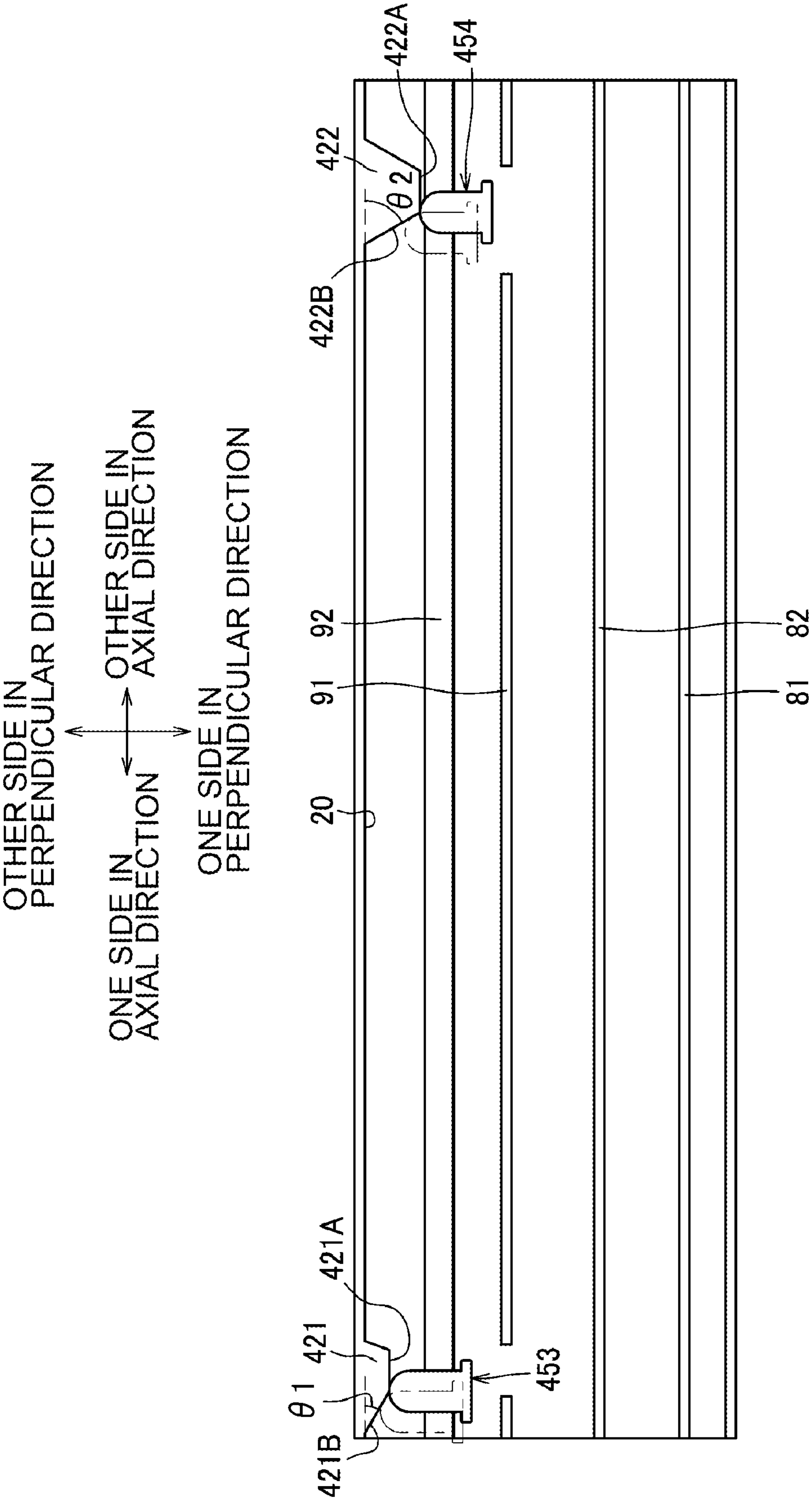
FIG. 10 illustrates a slot having a first inclined surface and a second inclined surface according to a first modification.

As illustrated in FIG. 10, in a first modification, for example, a first inclined surface 421B of a first protrusion 421 and a second inclined surface 422B of a second protrusion 422 are inclined at respective different angles. More specifically, for example, an inclined angle θ1 of the first inclined surface 421B relative to the axial direction is smaller than an inclined angle θ2 of the second inclined surface 422B relative to the axial direction.

According to the first modification, having the first inclined surface 421B and the second inclined surface 422B to be inclined at the respective different angles may enable controlling the degree of increase of a pressing force of each of the first pressing member 453 and the second pressing member 454.

Figure 11A:
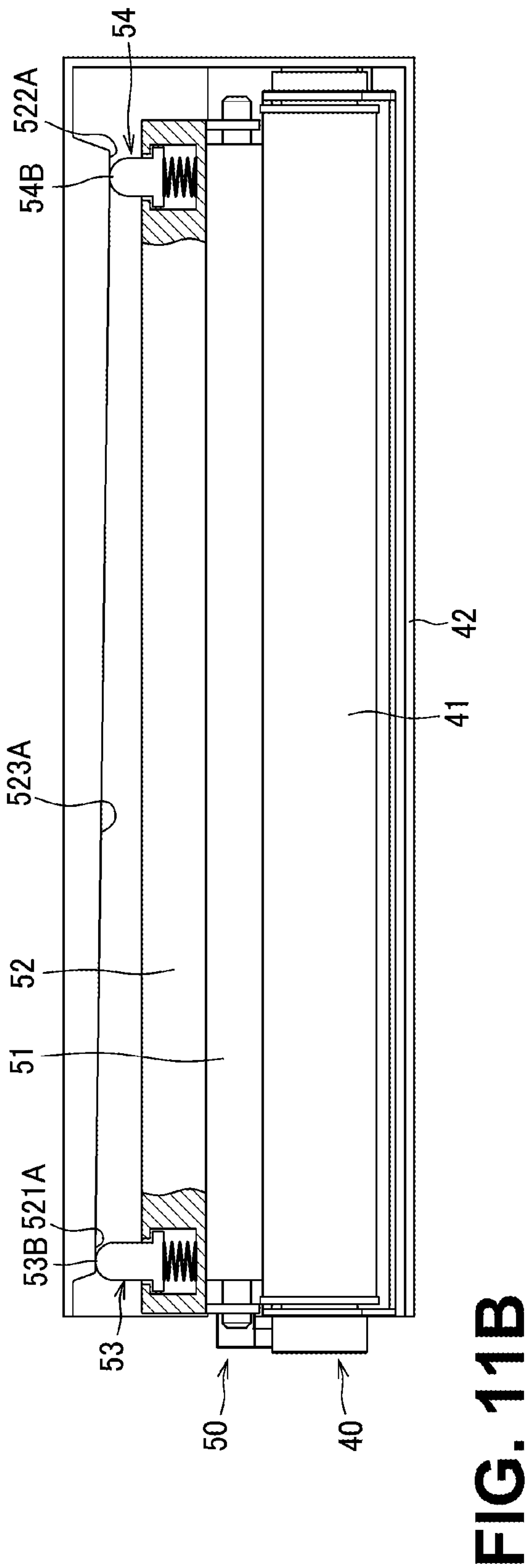
FIG. 11A illustrates a slot, a drum cartridge, and a developing cartridge according to a second modification.

In the first illustrative embodiment, each slot 20 includes a plurality of protrusions protruding from the inner surface of the slot 20. Nevertheless, in other embodiments, for example, each slot 20 may include a single protrusion. As illustrated in FIG. 11A, in a second modification, for example, a slot includes a single protrusion having a first inner surface 521A and a second inner surface 522A connected to each other by a third inclined surface 523A. The configuration according to the second modification may also achieve the same effects as those achieved by the first illustrative embodiment.

Figure 11B:
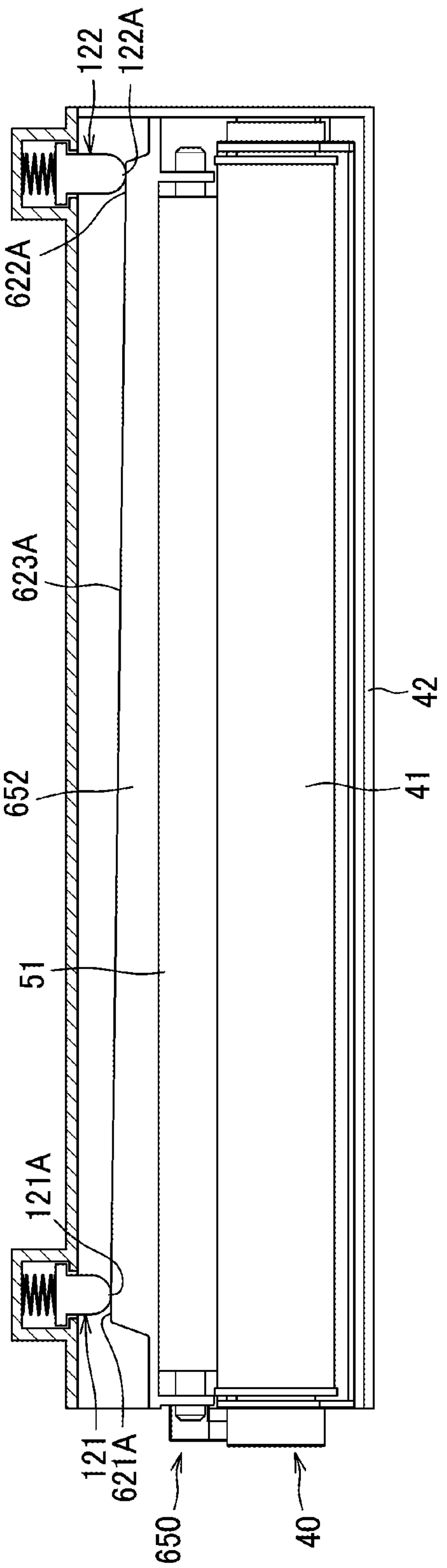
FIG. 11B illustrates a slot, a drum cartridge, and a developing cartridge according to a third modification.

In the second illustrative embodiment, each developing casing includes a plurality of protrusions protruding therefrom. Nevertheless, in other embodiments, for example, each developing casing may include a single protrusion. As illustrated in FIG. 11B, in a third modification, for example, a developing casing 652 includes a single protrusion having a first inner surface 621A and a second inner surface 622A connected to each other by a third inclined surface 623A. The configuration according to the third modification may also achieve the same effects as those achieved by the first illustrative embodiment.

In the first illustrative embodiment, the first pressing member and the second pressing member are urged by the respective springs. Nevertheless, in other embodiments, for example, springs themselves may serve as pressing members.

Figure 12A:
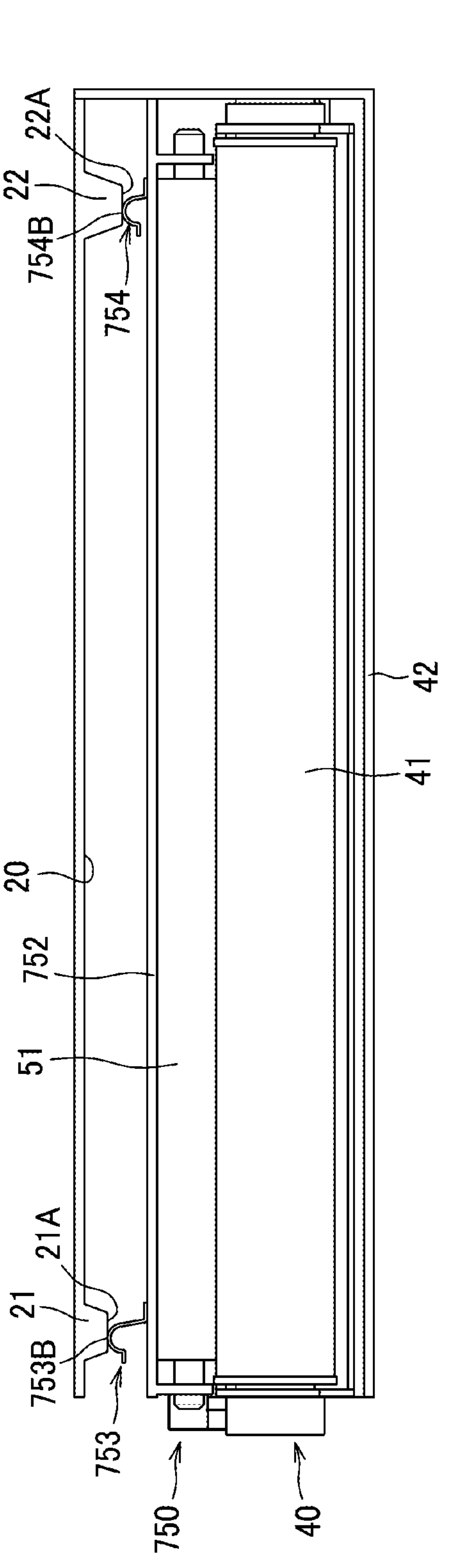
FIG. 12A illustrates a slot, a drum cartridge, and a developing cartridge according to a fourth modification.

As illustrated in FIG. 12A, in a fourth modification, for example, a developing cartridge 750 includes a developing casing 752 including a first leaf spring 753 and a second leaf spring 754. The first leaf spring 753 and the second leaf spring 754 are fixed to the developing casing 752. The first leaf spring 753 has a first contactable surface 753B at its particular portion. The second leaf spring 754 has a first contactable surface 754B at its particular portion.

According to the configuration of the fourth modification, as is the case with the first to fourth illustrative embodiments, inserting a developing cartridge 750 into a slot 20 in a state where a corresponding drum cartridge 40 is attached to the slot 20 may enable a developing roller 51 of the developing cartridge 750 to be pressed toward a photosensitive drum 41 of the drum cartridge 40. Examples of the springs are not limited to such leaf springs but include torsion springs. Consequently, the configuration according to the fourth modification may enable reduction of a parts count.

In the second illustrative embodiment, the first pressing member 121 has the first inner surface 121A at its tip. Nevertheless, in other embodiments, for example, an urging member may have such a first contactable surface at its particular portion. In the second illustrative embodiment, the second pressing member 122 has the second inner surface 122A at its tip. Nevertheless, likewise, in other embodiments, for example, an urging member may have such a second contactable surface at its particular portion.

Figure 12B:
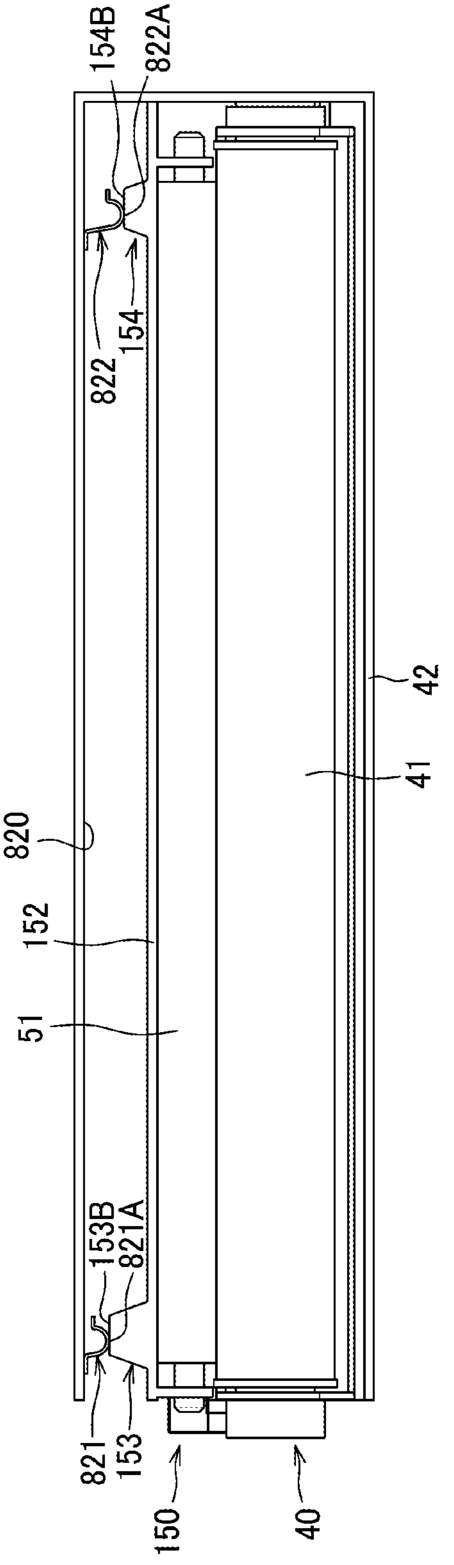
FIG. 12B illustrates a slot, a drum cartridge, and a developing cartridge according to a fifth modification.

As illustrated in FIG. 12B, in a fifth modification, for example, a slot 820 includes a first leaf spring 821 and a second leaf spring 822. The first leaf spring 821 has a first contactable surface 821A at its particular portion. The second leaf spring 822 has a second contactable surface 822A at its particular portion.

According to the configuration of the fifth illustrative embodiment, as is the case with the second illustrative embodiment, inserting a developing cartridge 150 into the slot 820 in a state where a corresponding drum cartridge 40 is attached to the slot 820 may enable a developing roller 51 of the developing cartridge 150 to be pressed toward a photosensitive drum 41 of the drum cartridge 40. Examples of the springs are not limited to such leaf springs but include torsion springs. Consequently, the configuration according to the fifth modification may enable reduction of a parts count.

In the above-described illustrative embodiments and modifications, the image forming apparatus 1 may be a color printer. Nevertheless, the disclosure is not limited to the color printer. In other embodiments, for example, the disclosure may be applied to other image forming apparatuses such as monochrome printers, copying machines, and multifunction devices.

The elements described in the respective illustrative embodiments or modifications may be combined to implement the disclosure.

What is claimed is:

1. An image forming apparatus comprising:

a drum cartridge including a photosensitive drum rotatable about a first axis extending in an axial direction;

a developing cartridge including a developing roller rotatable about a second axis extending in the axial direction and a developing casing configured to accommodate toner;

a main body casing having a slot extending in the axial direction, the slot allowing attachment and detachment of the drum cartridge in the axial direction and allowing attachment and detachment of the developing cartridge in the axial direction; and a first inner surface located inside the slot; and a second inner surface located inside the slot and spaced away from the first inner surface in the axial direction;

wherein the developing casing further includes:

a first contact surface configured to come into contact with the first inner surface when the developing cartridge is attached in the slot in a state where the drum cartridge is attached in the slot; and a second contact surface configured to come into contact with the second inner surface when the developing cartridge is attached in the slot in a state where the drum cartridge is attached in the slot;

wherein in a state in which the drum cartridge is attached in the slot and the developing cartridge is detached from the slot, the first inner surface is located farther from the photosensitive drum than the second inner surface, and wherein in a state in which the developing cartridge is detached from the slot, the first contact surface is located farther from the developing roller than the second contact surface.

2. The image forming apparatus according to claim 1, wherein the first inner surface is in contact with the first contact surface and the second inner surface is in contact with the second contact surface so that the first inner surface and the second inner surface press the developing casing towards the photosensitive drum.

3. The image forming apparatus according to claim 1, further comprising an intermediate transfer belt located above the drum cartridge and the developing cartridge in a state where the drum cartridge and the developing cartridge are attached to the main body casing, the intermediate transfer belt being in contact with a surface of the photosensitive drum in a state where the drum cartridge and the developing cartridge are attached to the main body casing.

4. The image forming apparatus according to claim 3, further comprising a discharge roller located above the intermediate transfer belt and configured to discharge a recording sheet.

5. The image forming apparatus according to claim 1, wherein the second contact surface is not in contact with the first inner surface when the developing cartridge is attached into the slot in a state where the drum cartridge is attached to the main body casing.

6. The image forming apparatus according to claim 1, wherein the main body casing includes a first pressing member and a second pressing member, wherein the first inner surface is located at a distal end of the first pressing member, and wherein the second inner surface is located at a distal end of the second pressing member.

7. The image forming apparatus according to claim 6, wherein the first pressing member and the second pressing member are movable by an urging force of a spring.

8. The image forming apparatus according to claim 6, wherein the first contact surface is located at a distal end of a first protruding portion protruding from the developing casing, and wherein the second contact surface is located at a distal end of a second protruding portion protruding from the developing casing.

9. The image forming apparatus according to claim 1, further comprising a cover movable between a closed position in which the slot is closed and an open position in which the slot is open, wherein the second surface is farther from the cover in the axial direction than the first inner surface.

10. The image forming apparatus according to claim 9, wherein the main body casing includes a first inclined surface located on one side of the first inner surface in the axial direction, and wherein the first inclined surface extends away from the developing roller as the first inclined surface approaches the cover from the first inner surface in a state where the drum cartridge and the developing cartridge are attached to the main body casing.

11. The image forming apparatus according to claim 9, wherein the main body casing includes a second inclined surface located on one side of the second inner surface in the axial direction, and wherein the second inclined surface extends away from the developing roller as the second inclined surface approaches the cover from the second contact surface in a state where the drum cartridge and the developing cartridge are attached to the main body casing.

12. The image forming apparatus according to claim 1, wherein the developing cartridge includes a plurality of developing cartridges arranged in an orthogonal direction orthogonal to the axial direction, and wherein both the first inner surface and the second inner surface are located corresponding to each of a plurality of the developing cartridges.

13. The image forming apparatus according to claim 12, wherein the contact surface is located on a surface of the developing casing facing the orthogonal direction.

14. The image forming apparatus according to claim 1, wherein the developing cartridge includes an elongated hole located at one end of the developing casing in the axial direction, the elongated hole allowing the developing cartridge to be moved by the first inner surface and the second inner surface.

15. The image forming apparatus according to claim 1, wherein, in a state where the first inner surface is in contact with the first contact surface and the second inner surface is in contact with the second contact surface, the first inner surface and the second inner surface press the developing casing so that the developing roller is in contact with the photosensitive drum.

* * * * *